(12) United States Patent
Takahara

(10) Patent No.: US 6,705,636 B2
(45) Date of Patent: Mar. 16, 2004

(54) HEAD PROTECTION AIRBAG SYSTEM

(75) Inventor: Isamu Takahara, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/084,482

(22) Filed: Feb. 28, 2002

(65) Prior Publication Data

US 2002/0140211 A1 Oct. 3, 2002

(30) Foreign Application Priority Data

Mar. 27, 2001 (JP) ........................................ 2001-091232

(51) Int. Cl.[7] .......................... B60R 21/22; B60R 21/26
(52) U.S. Cl. ............................ 280/728.2; 280/730.2; 280/740
(58) Field of Search .......................... 280/729, 730.2, 280/730.1, 728.2, 736, 740

(56) References Cited

U.S. PATENT DOCUMENTS

| | | | | |
|---|---|---|---|---|
| 3,868,125 A | * | 2/1975 | Fisher et al. ................. | 280/740 |
| 6,158,766 A | * | 12/2000 | Kowalski ................. | 280/730.1 |
| 6,224,089 B1 | * | 5/2001 | Uchiyama et al. ....... | 280/730.2 |
| 6,241,278 B1 | * | 6/2001 | Roote et al. .............. | 280/730.2 |
| 6,257,616 B1 | * | 7/2001 | Nowak et al. ........... | 280/730.2 |
| 6,293,581 B1 | * | 9/2001 | Saita et al. .............. | 280/730.2 |
| 6,312,008 B1 | * | 11/2001 | Neag ........................ | 280/730.2 |
| 6,543,804 B2 | * | 4/2003 | Fischer ..................... | 280/730.2 |

FOREIGN PATENT DOCUMENTS

| | | | |
|---|---|---|---|
| EP | 904992 A2 | * 3/1999 | ........... B60R/21/16 |
| JP | 8-175311 | 7/1996 | |
| JP | 3052085 B1 | 6/2000 | |
| JP | 2000-159048 A | 6/2000 | |
| JP | 3129408 B2 | 1/2001 | |
| JP | 2001-334902 | 12/2001 | |

* cited by examiner

*Primary Examiner*—Peter C. English
(74) *Attorney, Agent, or Firm*—Oliff & Berridge, PLC

(57) ABSTRACT

A head protection airbag system for a vehicle with a roof side rail includes an airbag stored in the vehicle along the roof side rail, and an inflator mounted to the roof side rail. The inflator is operable to supply a gas that inflates the airbag so that the airbag deploys into a curtain-like shape along a side wall of a passenger compartment. A bracket, which is formed of an energy absorbing material, is interposed between the roof side rail and the inflator for mounting the inflator to the roof side rail such that the inflator is movable over a predetermined distance, whereby an external force applied to the inflator is mitigated by the bracket.

9 Claims, 5 Drawing Sheets

HEAD PROTECTION AIRBAG SYSTEM

BACKGROUND OF THE INVENTION

1. Field of Invention

The invention relates generally to an airbag system installed on a motor vehicle, and more particularly to a head protection air bag system adapted for protecting a head of an occupant of the vehicle.

2. Description of Related Art

In a known example of the head protection air bag system of the above type as disclosed in, for example, Japanese Patent No. 3052085, an airbag stored in a vehicle roof portion along a roof side rail inflates and deploys into a curtain-like shape, to extend along a side wall of a passenger compartment, when the airbag is supplied with gas fed from an inflator that is mounted on the roof side rail.

In the head protection airbag system of the above type, in which the inflator is mounted along the roof side rail, it is possible that the occupant of the vehicle can hit his/her head against the inflator. In view of this possibility, the airbag system disclosed in Japanese Patent No. 3052085 employs an arrangement in which the inflator is located between a front-seat inflatable portion (having a first group of cells) for protecting a front-seated occupant and a rear-seat inflatable portion (having a second group of cells) for protecting a rear-seated occupant. With this arrangement, the occupant is less likely to hit his/her head against the inflator. Although the above-indicated Japanese Patent discloses a passive countermeasure for reducing the above-described possibility of hitting the occupant's head against the inflator, positive measures have not been proposed to mitigate or reduce an impact that could occur upon hitting of the occupant's head against the inflator.

SUMMARY OF THE INVENTION

In view of the above-described disadvantages, there is provided according to one aspect of the invention a head protection airbag system for a vehicle including a roof side rail, which system comprises: (a) an airbag stored in the vehicle along the roof side rail, (b) an inflator mounted to the roof side rail, the inflator being operable to supply gas for inflating the airbag so that the airbag deploys into a curtain-like shape along a side wall of a vehicle compartment, and (c) a bracket that is formed of an energy absorbing material and is interposed between the roof side rail and the inflator for mounting the inflator to the roof side rail such that the inflator is movable over a predetermined distance, whereby an external force applied to the inflator is mitigated by the bracket.

With the head protection airbag system constructed as described above, even if an occupant of the vehicle hits the head against the inflator, external force (or an impact) applied to the inflator upon hitting is mitigated due to an energy absorbing effect of the bracket formed of the energy absorbing material. Thus, an impact that would occur upon hitting of the occupant's head against the inflator can be sufficiently mitigated or suppressed.

In a preferred embodiment of the invention, the vehicle further includes a roof headlining that is disposed on one side of the inflator closer to the vehicle compartment so as to cover the inflator, and the head protection airbag system further comprises an energy absorbing member mounted on a portion of the roof headlining that faces the inflator.

In the above embodiment in which the energy absorbing member is mounted on a portion of a back surface of the roof headlining that faces the inflator, an impact that would occur upon hitting of the occupant's head against the inflator can also be mitigated due to an energy absorbing effect of the energy absorbing member.

BRIEF DESCRIPTION OF THE DRAWINGS

The foregoing and/or further objects, features and advantages of the invention will become more apparent from the following description of an exemplary embodiment with reference to the accompanying drawings, in which like numerals are used to represent like elements and wherein:

FIG. 2 is folded and stored in position; FIG. 2 is folded and stored in position.

DETAILED DESCRIPTION OF EXEMPLARY EMBODIMENTS

Figure 1:
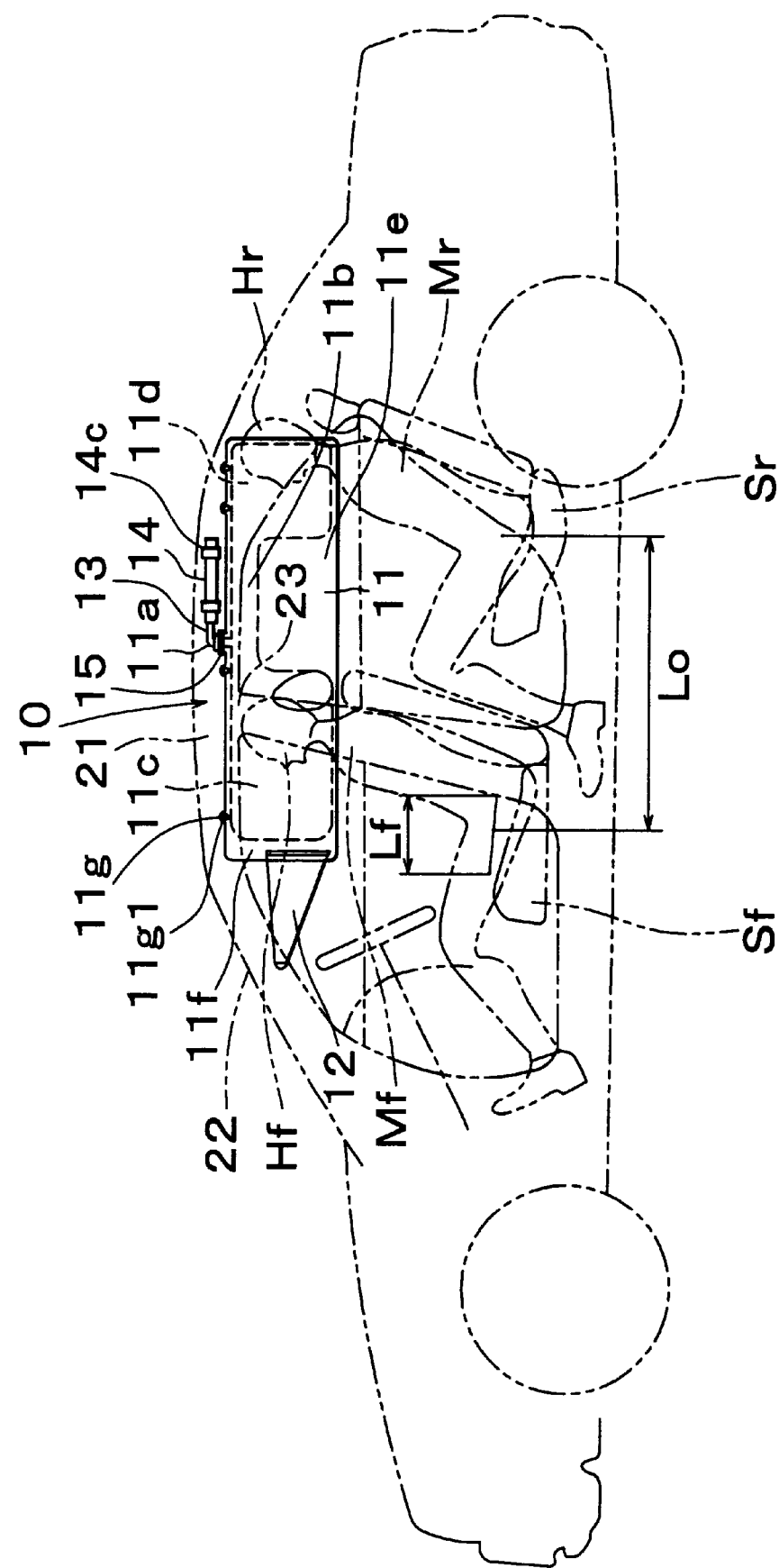
FIG. 1 is a side view showing a passenger car equipped with a head protection airbag system according to one preferred embodiment of the invention.
Figure 2:
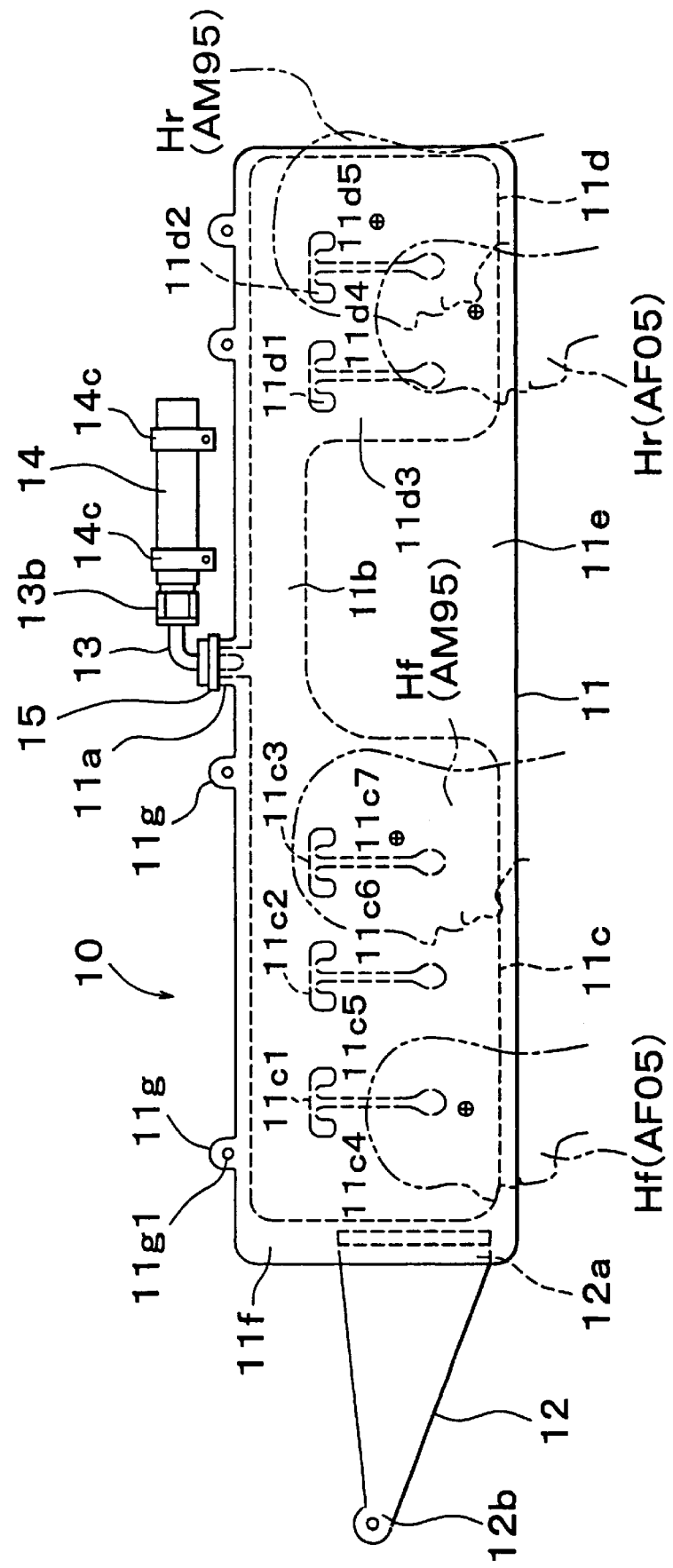
FIG. 2 is an enlarged side view showing an airbag module included in the airbag system as shown in FIG. 1.

One exemplary embodiment of the invention will be described with reference to the drawings. FIG. 1 through FIG. 7 illustrate a head protection airbag system for a motor vehicle, such as a passenger car, according to the preferred embodiment of the invention. The airbag system includes an airbag module 10 that principally consists of an airbag 11, a tension cloth 12 attached to a front end portion of the airbag 11, a diffuser pipe 13 and an inflator 14. The airbag 11 is adapted to inflate and deploy into a curtain-like shape along a side wall of the passenger compartment, as shown in FIGS. 1 and 2, when it is supplied with gas. The inflator 14 is gastightly attached to the diffuser pipe 13, which in turn is gastightly attached to a gas inlet 11a of the airbag 11, in the manners as described later.

The airbag 11 is formed in a hollow or tubular shape such that its weave texture extends in longitudinal (i.e., running) direction and vertical direction of the vehicle. The airbag 11 is provided at its surface with a coating for maintaining the gas tightness thereof. The airbag 11 defines the gas inlet 11a, and a gas passage 11b that is located below the gas inlet 11a to extend in a direction substantially perpendicular to the gas inlet 11a and in the longitudinal (running) direction of the vehicle. The airbag 11 also includes a front-seat inflatable portion 11c and a rear-seat inflatable portion 11d that communicate with each other via the gas passage 11b, an intermediate non-inflatable portion 11e, a front end non-inflatable portion 11f, and four mounting pieces 11g. Each of the mounting pieces 11g is formed with a mounting hole 11g1 used for attaching the air bag 11 to the roof side rail 21.

As shown in FIG. 1 and FIG. 2, the front-seat inflatable portion 11c is provided for protecting a head Hf of a front-seated occupant Mf who is seated in a front seat Sf (that is, a seat located beside the B pillar 23). The front-seat inflatable portion 11c has four inflation chambers (or cells) 11c4, 11c5, 11c6, 11c7 that are partially defined by three T-shaped separating portions (non-inflatable portions) 11c1, 11c2, 11c3 provided at vertically intermediate positions. The inflation chambers 11c4–11c7 communicate with each other at their upper and lower end portions on vertically opposite sides of the T-shaped separating portions 11c1–11c3.

FIG. 2 shows a head Hf (AF05) of, e.g., an American woman having a small height (AF05: AF is an abbreviation of "American Female", and AF05 represents an American female whose height is at 5% in a distribution map in which the heights of numerous American women are plotted in the increasing order), when the woman is seated normally in a slidable front seat having the front-most position. FIG. 2 also shows a head Hf (AM95) of e.g., an American man having a large height (AM95: AM is an abbreviation of "American Male" and AM95 represents an American male whose height is at 95% in a distribution map in which the heights of numerous American men are plotted in the increasing order), when the man is seated normally in a slidable front seat having the rear-most position.

As shown in FIG. 1 and FIG. 2, the rear-seat inflatable portion 1d is provided for protecting a head Hr of a rear-seated occupant Mr who is seated in a rear seat Sr. The rear-seat inflatable portion 11d has three inflation chambers (or cells) 11d3, 11d4, 11d5 that are partially defined by two T-shaped separating portions (non-inflatable portions) 11d1, 11d2 provided at vertically intermediate positions. The inflation chambers 11d3, 11d4 and 11d5 communicate with each other at their upper and lower end portions on vertically opposite sides of the T-shaped separating portions 11d1 and 11d2.

FIG. 2 shows a head Hr (AF05) of an American woman having a small height (AF05 having the same definition as described above) when the woman is seated normally in a rear seat. FIG. 2 also shows a head Hr (AM95) of an American man having a large height (AM95 having the same definition as described above) when the man is seated normally in a rear seat. In FIG. 1, "Lo" represents a distance between a hip point of an occupant Mf who is seated in a slidable front seat that is placed in a reference or standard position, and a hip point of an occupant Mr who is seated in a rear seat. Also in FIG. 1, "Lf" represents a slide amount or distance over which the front seat Sf is slidable in the longitudinal (running) direction of the vehicle.

The tension cloth 12 is formed from a non-coated, triangular fabric that is thinner and cheaper than a fabric used for forming the airbag 11. The shape of the tension cloth 12 may be changed as desired. The tension cloth 12 is sewed at its rear end portion 12a onto the front end non-inflatable portion 11f of the airbag 11, and is attached at its front end portion 12b to the A pillar 22, as shown in FIG. 1.

Figure 3:
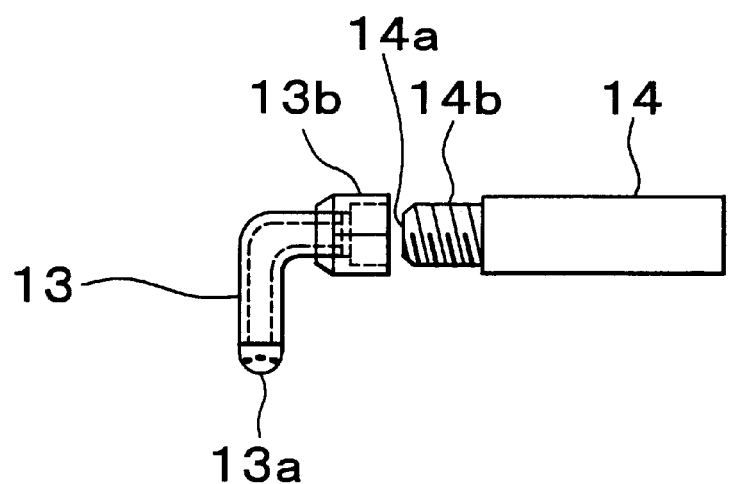
FIG. 3 is a side view showing a diffuser pipe and an inflator included in the airbag module as shown in FIG. 2.

The diffuser pipe 13 is formed with a relatively small thickness in a generally J shape, as shown in FIG. 2 and FIG. 3. The diffuser pipe 13 is fixedly coupled to the inflator 14 in a gastight manner, such that a flare nut 13b provided at one end of the diffuser pipe 13 is screwed on an externally threaded portion 14b formed at a gas outlet 14a of the inflator 14. The diffuser pipe 13 is also attached at the other end to the gas inlet 11a of the airbag 11 in a gastight manner, using a fastening band 15. The distal end portion of the diffuser pipe 13 remote from the inflator 14 has a smaller diameter than the gas inlet 11a of the airbag 11, and therefore a certain clearance is provided between the gas inlet 11a and the diffuser pipe 13. This clearance permits gas to be ejected from the distal end portion of the diffuser pipe 13 in radial directions.

Figure 6:
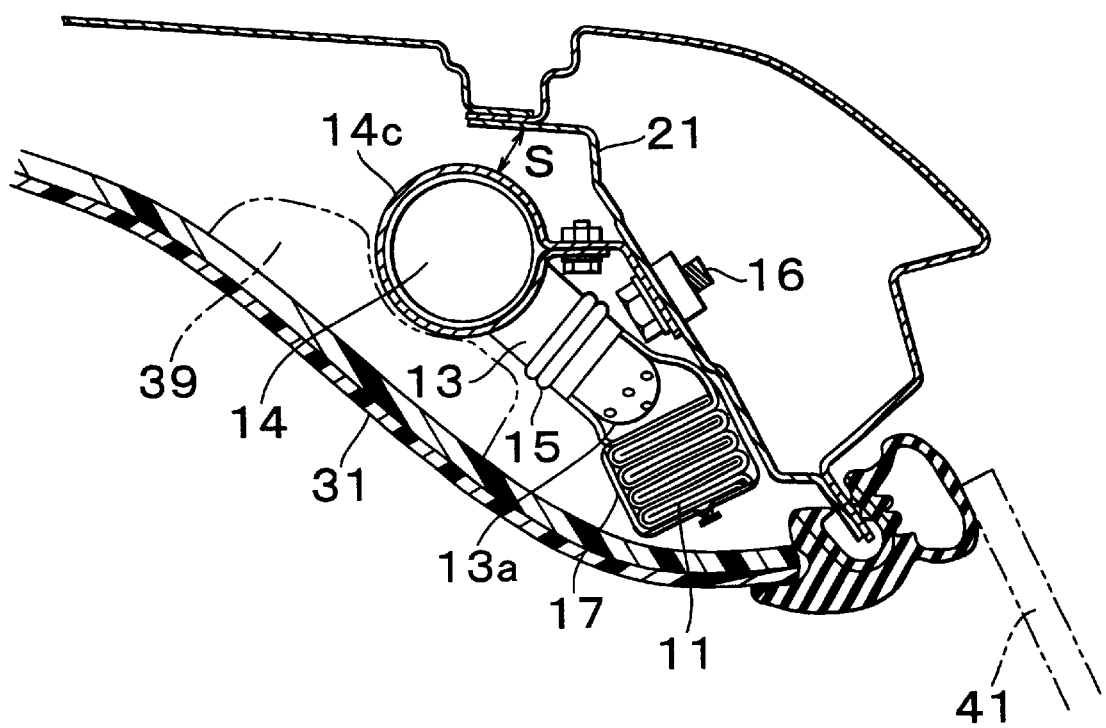
FIG. 6 is a vertical cross-sectional view of a portion of the airbag system as viewed from behind the inflator, in which the airbag as shown in FIG. 1

The diffuser pipe 13 is located rearwardly of the B pillar 23 such that its distal end is spaced a predetermined distance from the B pillar 23, as shown in FIG. 1. Also, the distal end portion of diffuser pipe 13 closer to the airbag 11 is directed obliquely and downwards, in a direction substantially parallel with a surface of a door glass 41 (i.e., side window), as shown in FIG. 6. In operation, a gas is supplied from above (i.e., from the diffuser pipe 13) into the gas passage 11b that extends in the airbag 11 in the longitudinal direction of the vehicle.

A showerhead 13a is formed as an integral (or separate) part of the distal end portion of the diffuser pipe 13, which provides a gas outlet of the diffuser pipe 13 and is exposed to the gas passage 11b of the airbag 11. The showerhead 13a serves to spread or diffuse gas supplied from the inflator 14 in three-dimensional or radial direction. The length of the distal portion of the diffuser pipe 13 is set so that the showerhead 13a does not protrude into the gas passage 11b of the airbag 11.

Figure 4:
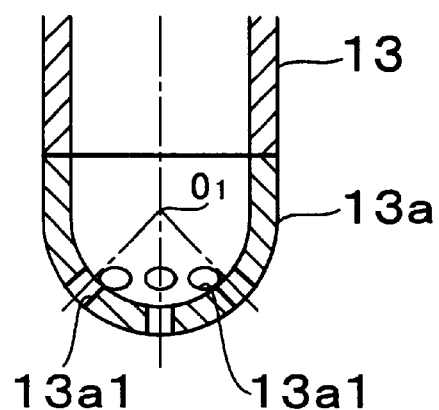
FIG. 4 is an enlarged cross-sectional view showing a showerhead provided at a distal end of the diffuser pipe of FIG. 3.
Figure 5:
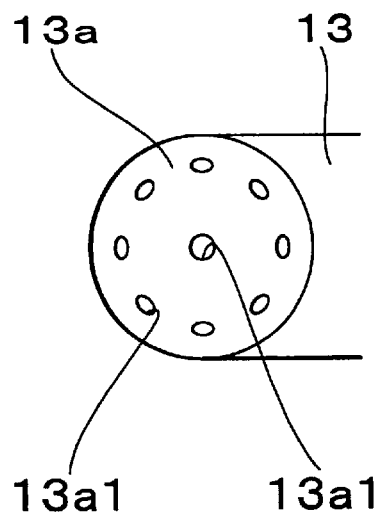
FIG. 5 is a bottom view of the showerhead of FIG. 4.

As illustrated in detail in FIG. 4 and FIG. 5, the showerhead 13a, functions to spread or diffuse gas supplied from the inflator 14 to the airbag 11 through the diffuser pipe 13 in a three-dimensional direction. The showerhead 13a is made of a metallic material and is formed in a generally semi-spherical shape, as shown in FIG. 4. A plurality of through-holes 13a1 are formed through a spherical surface of the showerhead 13a and extend in radial directions from a center 01 of a sphere that provides the spherical surface such that the through-holes 13a1 are symmetrical with respect to the center (or axis) of the showerhead 13a, as shown in FIG. 4.

The plurality of through-holes 13a1 include one through-hole formed at the center of the distal end portion of the diffuser pipe 13, and eight through-holes that are formed at equally spaced positions above the center through-hole and are arranged in the circumferential direction of the showerhead 13a. In this embodiment, the eight through-holes (13a1) and the center through-hole have substantially the same diameter. It is, however, to be understood that the diameter of the eight through-holes 13a1 formed at equal intervals in the circumferential direction may be made larger (or smaller) than that of the center through-hole formed at the distal end of the diffuser pipe 13. The showerhead 13a functions to change the flow of the gas supplied from the inflator 14, and also functions to divert flow of the gas supplied from the inflator 14, into a plurality of streams.

The inflator 14 is adapted to eject gas toward the airbag 11 upon, for example, a side collision or rollover of the vehicle. As shown in FIG. 6, a bracket 14c and a bolt 16, or the like, are used for attaching or mounting the inflator 14 to the roof side rail 21. The inflator 14 is located above the airbag 11 in a longitudinally intermediate portion of the vehicle (that is located rearwardly of the B pillar 23). The inflator 14 is covered with a roof headlining 31.

The bracket 14c, which may be called "EA bracket", is formed of an energy absorbing material that is capable of undergoing plastic deformation in response to an external force (or impact) applied thereto. Thus, the bracket 14c is able to undergo plastic deformation over a stroke S, while absorbing energy, until it abuts on the roof side rail 21. In the case where the airbag system is expected to absorb a large amount of energy, an energy absorbing pad 39 (e.g., a hard urethane pad) serving as an energy absorbing member may be mounted on a portion of a back surface of the roof headlining 31 that faces the inflator 14, as illustrated by a two-dot chain line in FIG. 6.

Figure 7:
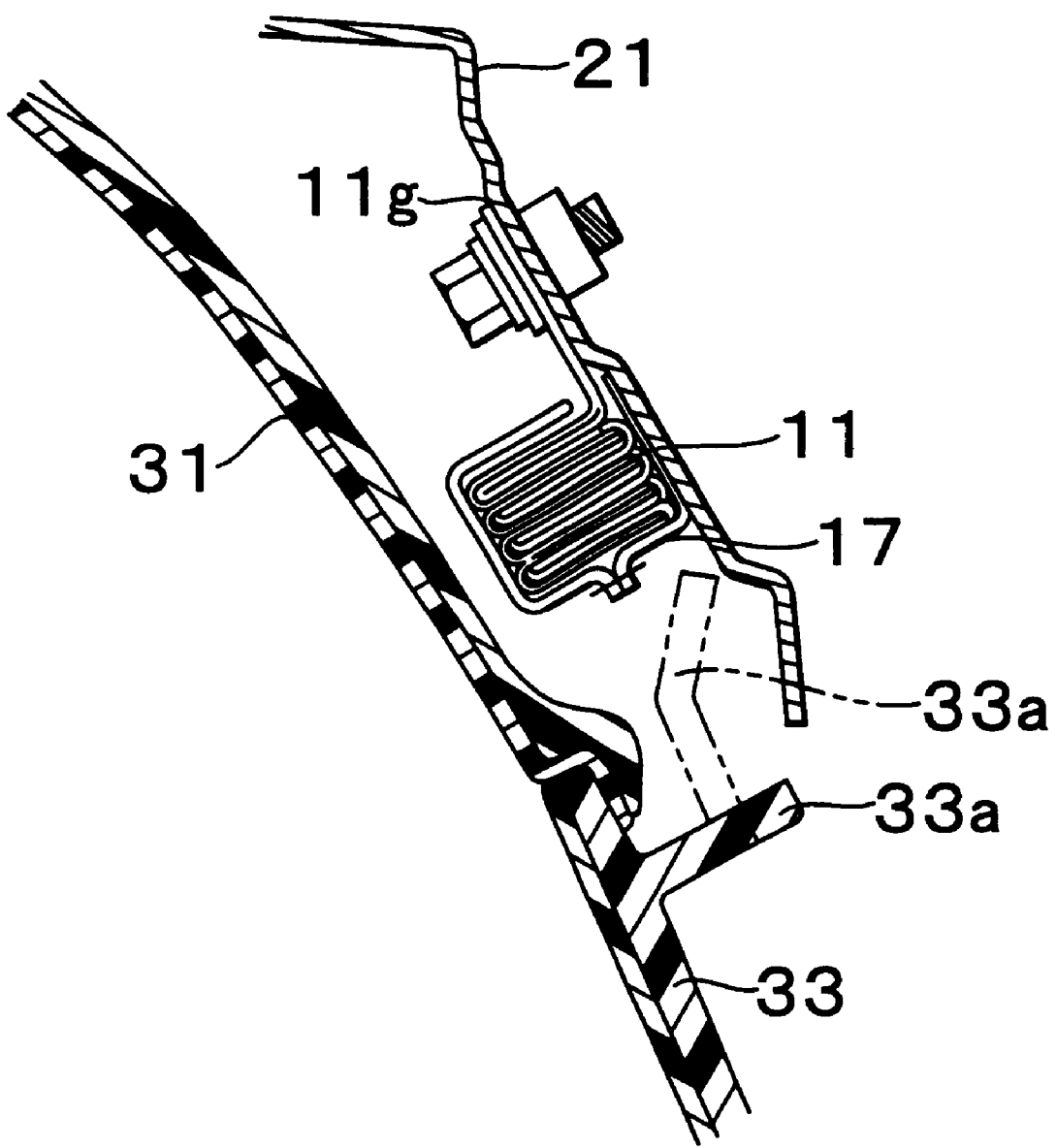
FIG. 7 is a vertical cross-sectional view of a portion of the airbag system corresponding to a B-pillar portion of the vehicle body, in which the airbag as shown in FIG. 1

When the airbag system of this embodiment constructed as described above is in a normal (i.e., non-activated) state, the airbag 11 and the tension cloth 12 are stacked in multiple folds in the vertical direction, and are received in a tearable bag 17 (as shown in FIG. 6 and FIG. 7) in a compact arrangement. In this state, the airbag 11 and the tension cloth 12 are stored along the A pillar 22 and the roof side rail 21, while being covered with an A-pillar garnish (not illustrated) and the roof headlining 31.

FIG. 7 shows a cross section of the airbag system taken at a portion of the vehicle body including a B-pillar garnish 33. A protrusion 33a is formed on a back surface of an upper portion of the B-pillar garnish 33, so as to extend in a direction away from the passenger compartment (i.e., the inside of the vehicle). The protrusion 33a serves to prevent the airbag 11, when it inflates and deploys, from entering a region behind the B-pillar garnish 33. The protrusion 33a may be formed in a generally L shape as indicated by a two-dot chain line in FIG. 7, such that its bent portion extends upwards and has an inclined surface that faces the airbag 11. With the protrusion 33a formed, the deploying airbag 11 is guided by the inclined surface of the protrusion 33a, so that the airbag 11 is prevented from being caught by the upper end of the B-pillar garnish 33.

Upon a side collision or rollover of the vehicle, for example, gas is ejected from the inflator 14 and is supplied into the gas passage 11b of the airbag 11 through the showerhead 13a of the diffuser pipe 13. As a result, the airbag 11 deploys downwards by deforming a corresponding portion of the roof headlining 31 toward the interior of the passenger compartment, while at the same time the tension cloth 12 deploys downwards by deforming a corresponding portion of the A-pillar garnish toward the interior of the passenger compartment. In this manner, the airbag 11 inflates and deploys into a curtain-like shape along a side wall of the passenger compartment, as shown in FIG. 1. At this time, the respective inflatable portions 11c and 11d of the airbag 11 are caused to inflate and deploy toward corresponding head protection areas that are located beside the heads Hf, Hr of the occupants Mf, Mr, respectively.

In the present embodiment, the inflator 14 is attached to the roof side rail 21 through the bracket 14c formed of an energy absorbing material, such that the inflator 14 is movable over a predetermined distance S, as shown in FIG. 6. With this arrangement, the external force (or impact) applied to the inflator 14 can be mitigated by the bracket 14c. Accordingly, even if the occupant Mr hits the head Hr against the inflator 14, the external force (or impact) applied to the inflator 14 upon hitting can be mitigated due to an energy absorbing effect of the bracket 14c made of the energy absorbing material. Thus, an impact that would occur upon hitting of the head Hr of the occupant Mr with the inflator 14 can be sufficiently mitigated or reduced.

In the case where the energy absorbing pad 39 is mounted on a portion of the back surface of the roof headlining 31 that faces the inflator 14, as indicated by the two-dot chain line in FIG. 6, an impact that would occur upon hitting of the head Hr of the occupant Mr with the inflator 14 can also be mitigated or suppressed due to an energy absorbing effect of the energy absorbing pad 39.

In the airbag system of the embodiment, the gas inlet 11a of the airbag 11 is provided between the front-seat inflatable portion 11c and the rear-seat inflatable portion 11d. This arrangement makes it possible to supply gas to the front-seat inflatable portion 11c and the rear-seat inflatable portion 11d of the airbag 11 at approximately the same time, and to inflate and deploy the front-seat inflatable portion 11c and the rear-seat inflatable portion 11d at approximately the same time within a sufficiently short time.

While the head protection airbag system of the exemplary embodiment of this invention is provided with the airbag 11 having the front-seat inflatable portion 11c and the rear-seat inflatable portion 11d, the invention is also equally applicable to other types of head protection airbag systems including, for example, an airbag having only an inflatable portion for protecting a front-seated occupant, or an airbag having three inflatable portions for front, middle and rear seats.

While the head protection airbag system of the exemplary embodiment is intended for use in a passenger car or similar types of vehicles, the invention is also equally applicable to head protection airbag systems for use in other types of vehicles. Furthermore, while the energy absorbing pad 39 (more specifically, a hard urethane pad) is employed as an energy absorbing member in the exemplary embodiment, the energy absorbing member may take the form of, for example, a hollow energy absorbing member, a rib made of a resin or any other suitable energy absorption material.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A head protection airbag system for a vehicle including a roof side rail, the system comprising:

an airbag stored in the vehicle along the roof side rail;

an inflator mounted to the roof side rail and operable to supply a gas that inflates the airbag so that the airbag deploys into a curtain shape along a side wall of a vehicle compartment of the vehicle; and a bracket formed of an energy absorbing material interposed between the roof side rail and the inflator, the inflator mounted to the roof side rail by the bracket such that the inflator is movable over a predetermined distance, and the bracket is attached to the roof side rail at a location between the inflator and the airbag, and whereby an external force applied to the inflator is mitigated by the bracket.

2. The head protection airbag system according to claim 1, wherein the vehicle further includes a roof headlining disposed on a side of the inflator closer to the vehicle compartment so as to cover the inflator, the head protection airbag system further comprising:

an energy absorbing member mounted on a portion of the roof headlining that faces the inflator.

3. The head protection airbag system according to claim 2, wherein the energy absorbing member comprises an energy absorbing pad.

4. The head protection airbag system according to claim 1, further comprising a diffuser pipe gas-tightly coupled to a gas outlet of the inflator and a gas inlet of the airbag so as to connect the inflator with the airbag.

5. The head protection airbag system according to claim 4, wherein the diffuser pipe includes a distal end portion exposed to a gas passage formed in the airbag in a longitudinal direction of the vehicle, the distal end portion of the diffuser pipe having a plurality of holes through which the gas is ejected.

6. The head protection airbag system according to claim 4, wherein the airbag includes a front-seat inflatable portion that protects a front-seated occupant, and a rear-seat inflatable portion that protects a rear-seated occupant, and wherein the gas inlet of the airbag is located between the front-seat inflatable portion and the rear-seat inflatable portion.

7. The head protection airbag system according to claim 1, wherein the airbag includes a front-seat inflatable portion that protects a front-seated occupant, and a rear-seat inflatable portion that protects a rear-seated occupant, and wherein at least a part of the inflator is disposed between the front-seat inflatable portion and the rear-seat inflatable portion.

8. The head protection airbag system according to claim 1, wherein the vehicle further includes a B-pillar garnish disposed below the airbag, the B-pillar garnish having a protrusion formed on a back surface thereof so as to prevent the airbag, upon deployment thereof, from entering a region of the vehicle located behind the B-pillar garnish.

9. The head protection airbag system according to claim 8, wherein the protrusion includes an inclined surface that guides the airbag during deployment of the airbag to prevent the airbag from being caught by the B-pillar garnish.

* * * * *